Dec. 29, 1931.  R. W. DEARDORFF  1,838,371
ELECTROMAGNETIC WAVE EXPLORER
Filed April 14, 1924
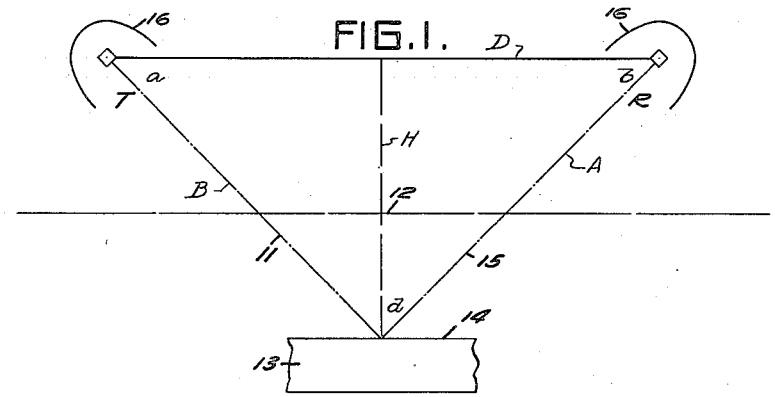
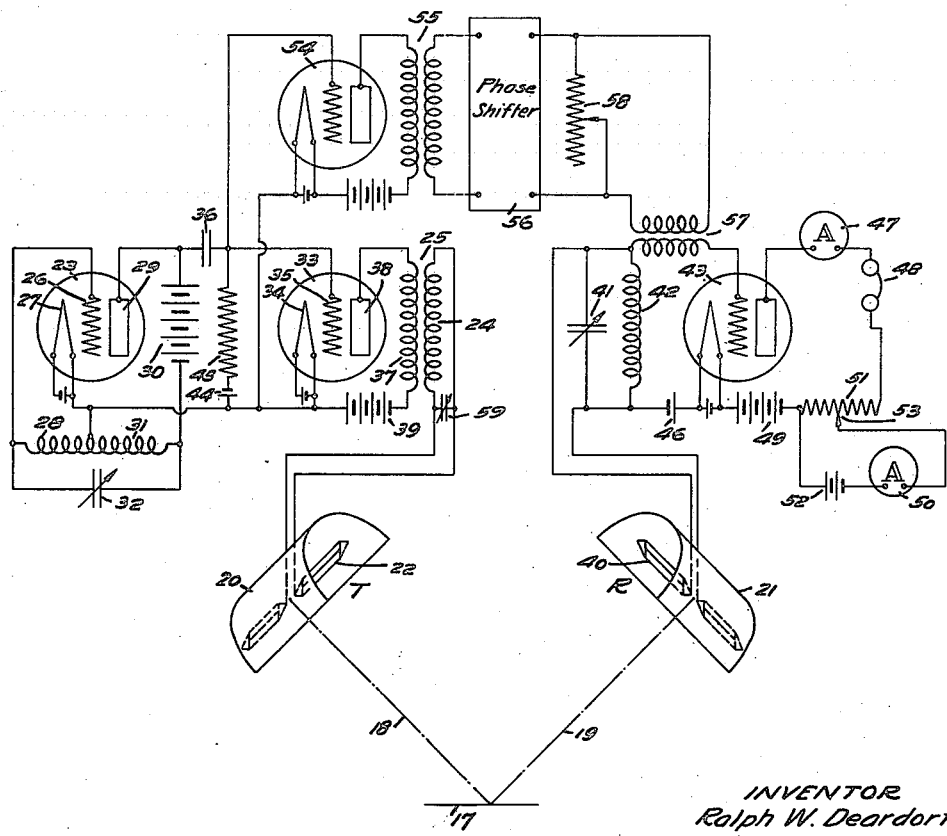
INVENTOR
Ralph W. Deardorff
BY
White Frost Trans
his ATTORNEYS.

Patented Dec. 29, 1931

1,838,371

UNITED STATES PATENT OFFICE

RALPH W. DEARDORFF, OF CONTRA COSTA COUNTY, CALIFORNIA

ELECTROMAGNETIC WAVE EXPLORER

Application filed April 14, 1924. Serial No. 706,356.

This invention relates to the detection of mineral deposits, such as oil or ores, and more particularly to a system whereby electromagnetic wave radiations may be employed for this purpose.

It is one of the objects of my invention to make it possible not only to discover the presence of such deposits, but also to locate them definitely by the aid of directional transmission and detection of electromagnetic radiations. In the broadest aspects, it is not essential that the transmission be directional so long as the detection is arranged to be so.

It is another object of my invention to make it possible to determine the character of the deposits by causing them to act as reflectors of electromagnetic radiant energy, and by ascertaining the quality of the reflection as a function of the frequency used for the radiations.

It is another object of my invention to make it possible to investigate the character of the invisible deposits by determining the speed at which the radiations pass through the medium formed by the deposits.

My invention possesses other advantageous features, some of which with the foregoing, will be set forth at length in the following description, where I shall outline in full those forms of my invention which I have selected for illustration in the drawings accompanying and forming part of the present specification. Although I have shown in the drawings but a few embodiments of my invention, I do not desire to be limited thereto, since the invention as expressed in the claims may be embodied in many other forms.

Referring to the drawings:

Figure 1 is a schematic figure, showing in highly skeletonized form the principle of operation of my invention; and Fig. 2 is a more detailed wiring diagram of a possible commercial form of system making use of my invention.

It is one of the features of my invention to project electromagnetic waves directively and to receive them again after reflection. Such a system is indicated diagrammatically in Fig. 1, where T is intended to illustrate a directive transmitter. This transmitter is shown as projecting a beam 11 of radiation through the earth's surface 12 and onto a subterranean deposit 13 having a reflecting surface 14. According to the theory of this invention, the electromagnetic radiations behave as light waves, and therefore there is produced a reflected beam 15, the direction of which may be determined by a directional receiver R. For example, in Fig. 1, let the line D indicate the distance between the transmitter T and the receiver R. The sides B and A of the triangle BDA are determined by the well-known trigonometrical relations $$A = \frac{D \sin a}{\sin (\pi - a - b)}$$

and $$B = \frac{D \sin b}{\sin (\pi - a - b)}$$

The distance H of the reflecting surface 14 is then determined from the formula $H = B \sin a$.

The use of the invention as thus described is relatively simple. In order to explore any region for deposits, the transmitter T and receiver R are spaced apart a known distance, and they are arranged to be movable in vertical angles and in a common vertical plane. Then transmitter T is gradually rotated in this vertical plane, and simultaneously, the receiver R is manipulated to trap any reflected beam such as 15. In case such a beam is received, the angular deviations of the two beams 11 and 15 either from the horizontal or the vertical can be readily determined from the setting of the transmitter T and receiver R for reflecting position. It is therefore merely a simple problem in trigonometry to determine the position of the deposit 14, as well as its inclination to the horizontal.

The boundaries of the deposit, as well as other physical features, may readily be determined by multiplying observations thereon from different positions, in the manner outlined. For example, if the deposit has an extensive area upon which the transmitted beam 11 can fall, it is possible to vary the position of this beam gradually and therefore of the reflected beam 15, by simply moving the transmitter T through a vertical angle, and without shifting it from the spot. In the same manner, receiver R can be gradually shifted so as to maintain it always in proper receiving relation with the reflected beam 15. In this manner the extent of the reflecting surface, as represented by the extent of the line of intersection between the plane of the deposit and the plane of the instruments T and R, can be readily determined. By changing the vertical plane of the instruments, other dimensions of the reflecting surface can be determined.

The transmission and reception of beams of electromagnetic radiations present no serious problems, especially where the frequency of the radiation is very high. For example, one type of apparatus for securing this directive transmission and reception is quite clearly disclosed in Scientific Paper No. 469, of the Bureau of Standards, printed by the Government Printing Office at Washington, D. C. and on sale by the Superintendent of Documents. This paper describes directive transmission on a wave length of ten meters, but of course the directive effects can be secured for other wave lengths also, although more difficulty might be experienced in providing a commercial directive system for longer wave lengths. In this scheme for directional transmission or reception, use is made of a frame 16, comprising a plurality of bars forming isolated elements of a parabolic cylinder, and each bar is in a separate tuned circuit, insulated from each other, and resonant to the wave length to be transmitted. At the focal line of the parabolic cylinder, a radiating element such as an antenna is located. Further details of the directional system can be had from the paper hereinbefore identified.

A great advantage resulting from the use of my invention is that it is possible to discriminate between various kinds of deposits, due to their peculiar reflecting qualities. Thus some of them will reflect more energy at a certain wave length than at other wave lengths. Therefore, by noting the quantity of the response, as compared with the quantity of energy transmitted, as the frequency is varied, it is possible to determine which wave length is the most favorable for reflection; and to this wave length there will correspond a certain kind of mineral. This procedure is based on qualities entirely similar to those experienced in connection with light and heat waves, which after all, are produced also by electromagnetic waves but at a different order of frequencies. Thus light waves are reflected best by a smooth silvered surface, whereas heat waves are reflected best from a smooth copper surface.

In Fig. 2 I have illustrated one form of circuit that may be used in connection with my invention. In this figure, the line 17 represents the reflecting surface of a subterranean deposit, and lines 18 and 19 the transmitted and reflected beams respectively. The transmitter T is shown more in detail in this figure, the member 20 being intended to illustrate the parabolic cylinder formed of isolated bar elements; likewise the receiver R is similarly provided with a parabolic frame 21. At the focus of the frame 20 there is located an antenna system 22, which is supplied from a suitable source of high frequency oscillations, such as the oscillating thermionic tube 23. This antenna system has two branches as indicated, which are shown as connected to opposite sides of the secondary winding 24 of a transformer 25, receiving its energy from the tube 23 through the circuits now to be described. A variable condenser 59 may if desired be connected across the secondary winding 24 to tune the circuit.

In order to obtain oscillations by the aid of tube 23, its grid 26 is connected to the heated filament 27 through an inductance coil 28; and the plate 29 is also connected to the filament 27 through the usual plate battery 30 and the coil 31, which is closely coupled electromagnetically to coil 28, providing a regenerating system, as is well known. A variable condenser 32 is bridged across both coils 28 and 31, and serves to vary the frequency generated within limits. With such a circuit arrangement, it is possible to secure very high frequencies, of the order favorable for use with my invention. A circuit taking off the oscillations may be connected between the filament 27 and plate 29; in the present instance I amplify the oscillations thus secured by the aid of another thermionic device 33. The filament 34 and grid 35 of this device are connected across the filament and plate of the oscillating tube 23, and forms the input circuit for the amplifier 33. A stopping condenser 36 is preferably inserted in the connection from plate 29, so as to prevent direct current from plate battery 30 from flowing in this input circuit. The output circuit for the amplifier 33, leading from its plate 38 to filament 34, includes the primary coil 37 of transformer 25, as well as the usual plate battery 39. As is well understood, the amplifier 33 in this manner serves to increase very materially the amplitude of the oscillations of the current produced by the oscillator 23. Although but one stage of amplification is illustrated, it is evident that as many may be supplied as necessary to secure the proper power. Furthermore, a grid biasing battery 44 and high resistance 45 may be connected across the input side of amplifier 33, if necessary to maintain the oscillations against distortion by this tube.

The receiver R is also provided with two antenna sections 40, which are connected across a tuned receiving circuit comprising adjustable condenser 41 and inductance coil 42. For detecting the oscillations, a detector thermionic tube 43 may be used, the input circuit of which includes this receiving circuit as well as a grid biasing battery 46. If necessary, amplification may be resorted to, especially when the transmitter and receiver are very widely separated. Amplification is not shown in this figure, however. The output circuit for detector 43 may include one or more current responsive devices, such as ammeter 47 and phone 48, in addition to the usual plate battery 49. The ammeter 47 will indicate the relative strength of the signals by its deviation from a fixed value corresponding to no reception.

In order to indicate directly the strength of the received signals, and thereby the reflecting characteristic of the deposit under test, I prefer to provide another ammeter 50, which is arranged to have a zero reading when no radiations are received. For this purpose, a resistance 51 is included in the output circuit of detector 43. Across a variable portion of this resistance a shunt circuit is connected, including a source of potential 52 and the ammeter 50. The source of potential 52 is arranged to be in opposed phase relation with respect to the main plate battery 49. By this means, it is possible to adjust matters so that when no radiations are received, any current tending to flow from battery 49 through the shunt path 52—50 is exactly counterbalanced by the current due to battery 52. This condition is fulfilled when the variable contact 53 of the resistance 51 is so adjusted that the potential difference of battery 52 exactly balances the potential difference due to the current flow from battery 49, existing across that portion of the resistance 51 which is in parallel with the shunt circuit 52—50.

The provision of a transmitter and receiver that are both directive is important, although under certain circumstances, a non-directional transmitter could be used. Without a directional transmitter the angle of incidence upon the surface 17 would have to be determined in an inconvenient manner; without such a receiver, the angle of reflection could not be determined. Furthermore the use of such directional apparatus makes it possible to localize the area of the subterranean strata upon which radio waves are directed. Of course the directive effects, although substantial, cannot be perfect, and some direct straight line transmission takes place also, and is capable of affecting the receiving system to some extent. Furthermore, interfering reflections from other deposits or objects may also act to increase the effect of such stray transmission. For the sake of making very accurate observations, it is desirable to eliminate all such undersirable effects, and I accomplish this by the aid of a nullifying circuit conductively connecting the receiver R to the transmitter T, although the same result could be obtained otherwise. This circuit includes an amplifier tube 54, supplied from the oscillator 23, and having a transformer 55 in its output circuit. This transformer is in turn connected to a phase adjuster or shifter 56, whence the circuit continues to the primary coil of transformer 57. The secondary of this transformer is included in the input circuit of detector 43, and is the seat of an opposing E. M. F. of the proper phase and amplitude to nullify substantially exactly the non-directional energy transmitted from the transmitter T to receiver R, and due to other extraneous effects. The phase of this nullifying E. M. F. is adjusted by the aid of the phase shifter 56, and its amplitude by the aid of an adjustable resistor 58 connected across the transformer 57. A method in which this circuit can be adjusted and employed to advantage will be presently explained.

The description of the system of Fig. 2 is now complete. Its manner of use may now be briefly recapitulated. The transmitter T and receiver R are arranged to be movable in a common plane; the oscillator 23 being in operation, the transmitter T is gradually moved in the plane, and simultaneously, receiver R is correspondingly moved to pick up any reflected energy. This mode of exploration is continued until such energy is received; if necessary, by moving the receiver R backwards and forwards. Once the reflections are obtained, the frequency may be varied by adjusting condenser 32, to determine to which frequency the reflecting material responds most strongly. In this way the character of the deposit may be determined. Its dimensions, at least so far as its upper reflecting surface is concerned, may be obtained by shifting by small increments, the transmitted beam 18 and correspondingly shifting the receiver R. By a simple mathematical process, the points of response may then be plotted. It has been assumed of course, that the compensating circuit including the phase shifter 56 is properly adjusted, and that the circuits associated with the ammeter 50 have also been adjusted so that its reading is directly proportional to the intensity of the signals.

The use of the device to determine the nature of the deposit explored in accordance with its ability to respond as a reflector to radiations of varying frequency, has already been referred to. Another quality that may assist materially in determining the nature of the deposit, is the rate at which the intervening deposits transmit the radiations. This may be readily secured by determining the average wave length of the transmitted and reflected radiations; for example, by determining in well known ways how great a variation in frequency there must be in order that there be one more or one less wave length in the total distance traversed. After the wave length is determined at any frequency, the velocity can be found of course by multiplying this valve by the frequency. The result shows how fast the radiations travel to and from the deposit, and is of course useful in determining the nature of the deposit.

When it is desired to receive only energy reflected from the subterranean strata, the nullifying circuit is adjusted to neutralize all other energy picked up by the receiver emanating from the transmitter. For example the directional antennæ are turned to such a position that their effective fields do not intersect. Then the phase shifter 56 and resistance 58 can be adjusted until the energy received thru coupling 56 neutralizes other stray energy picked up by the receiver, for example radio energy received directly from the transmitter. Then when the antennæ are positioned in such a manner that energy is reflected from a lower strata and picked up by the receiver, the receiver response will be proportional to the intensity of the reflected energy and observations will not be confused by interfering energy.

I claim:

1. In a system for locating concealed objects, means for transmitting a directed beam of electromagnetic radiations onto a concealed object, a directional receiver for detecting the beam reflected from the object, and means for nullifying the effect of non-directional radiations between the transmitting means and the receiver.

2. In a system for locating subterranean deposits, a direction radio transmitter for directing a beam of electromagnetic radiations into the earth, a directional radio receiver spaced from the transmitter for receiving radiations reflected from a subterranean strata, and means electrically interconnecting the transmitter and receiver for directly impressing radio energy from the transmitter upon the receiver.

3. In a system for prospecting subterranean strata, a directional radio transmitter for directing a beam of electromagnetic radiations into the earth, a directional radio receiver spaced from the transmitter for receiving radiations reflected from a subterranean strata, means for directly impressing radio energy from the transmitter upon the receiver, and means for controlling the phase relationship of said latter energy.

In testimony whereof, I have hereunto set my hand.

RALPH W. DEARDORFF.